(12) United States Patent
Kojima

(10) Patent No.: US 6,568,445 B1
(45) Date of Patent: May 27, 2003

(54) PNEUMATIC TIRE COMPRISING CARCASS AND BELT OF ORGANIC FIBER CORDS WITH SPECIFIED MODULUS OF ELASTICITY

(75) Inventor: Teruhiko Kojima, Kawagoe (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/573,194

(22) Filed: May 18, 2000

(30) Foreign Application Priority Data

May 21, 1999 (JP) .......................................... 11-141282
Apr. 14, 2000 (JP) ........................................ 2000-113028

(51) Int. Cl.[7] .............................. B60C 9/02; B60C 9/18; B60C 9/22
(52) U.S. Cl. ...................... 152/526; 152/531; 152/535; 152/536; 152/548; 152/451; 152/556; 152/527
(58) Field of Search ................................. 152/526, 527, 152/531, 536, 548, 556, 451, 535

(56) References Cited

U.S. PATENT DOCUMENTS

| | | | | |
|---|---|---|---|---|
| 3,929,180 A | * | 12/1975 | Kawase et al. ............. | 152/556 |
| 4,155,392 A | * | 5/1979 | Duderstadt et al. ..... | 152/209.14 |
| 4,887,655 A | * | 12/1989 | Imai et al. .................. | 152/531 |
| 4,947,917 A | * | 8/1990 | Noma et al. ................. | 152/536 |
| 5,105,866 A | * | 4/1992 | Miwa .......................... | 152/538 |
| 5,339,878 A | * | 8/1994 | Takase ........................ | 152/527 |
| 5,441,093 A | * | 8/1995 | Shirasyouji et al. ........ | 152/454 |
| 6,016,857 A | * | 1/2000 | Roesgen et al. ......... | 152/209.1 |
| 6,267,165 B1 | * | 7/2001 | Westgate et al. ............ | 152/454 |

FOREIGN PATENT DOCUMENTS

| EP | 0 294 153 | 12/1988 |
|---|---|---|
| EP | 0 965 463 A2 | 12/1999 |
| WO | 98/56599 | 12/1998 |

* cited by examiner

Primary Examiner—Michael W. Ball
Assistant Examiner—Justin Fischer
(74) Attorney, Agent, or Firm—Sughrue Mion, PLLC

(57) ABSTRACT

A pneumatic tire comprises a carcass comprised of one or more carcass plies and a belt disposed on an outer periphery side of a crown portion of the carcass and comprised of one or more belt layers, wherein each of at least one carcass ply and at least one belt layer is constituted with organic fiber cords having a modulus of elasticity within a specified range.

1 Claim, 2 Drawing Sheets

PNEUMATIC TIRE COMPRISING CARCASS AND BELT OF ORGANIC FIBER CORDS WITH SPECIFIED MODULUS OF ELASTICITY

BACKGROUND OF THE INVENTION

1. Field of the Invention

This invention relates to a pneumatic tire, particularly a radial tire for passenger car capable of reducing the weight without sacrificing the steering stability, wear resistance and the like.

2. Description of Related Art

As a method of reducing a weight of a pneumatic radial tire comprising, for example, a radial carcass comprised of one or more carcass plies and a belt disposed on an outer periphery side of a crown portion of the radial carcass and comprised of one or more belt layers, there are proposed the thinning of rubber gauge in the tire, the construction of the belt with aramid fiber cords, the simplification of the belt structure itself and the like.

When the aramid fiber cord is used as a cord of the belt layer or the belt structure is simplified by decreasing the number of belt layers, however, there are caused such problems in the basic performances of the tire that the rigidity of the tread portion lowers and hence the high steering stability, wear resistance and the like can not be ensured as compared with the case of adopting the conventionally general belt structure using steel cord as a cord of the belt layer or extending cords of the belt layers so as to cross the cords of the layers with each other. This is substantially true even in the case that the rubber gauge in each constructional part of the tire is decreased to lower the rigidity of the tire casing.

SUMMARY OF THE INVENTION

It is, therefore, an object of the invention to solve the above problems of the conventional technique and to provide a pneumatic tire capable of effectively reducing the tire weight without lowering the steering stability, wear resistance and the like.

According to the invention, there is the provision of in a pneumatic tire comprising a carcass comprised of one or more carcass plies and a belt disposed on an outer periphery side of a crown portion of the carcass and comprised of one or more belt layers, the improvement wherein each of at least one carcass ply and at least one belt layer is constituted with organic fiber cords, and the organic fiber cord in the carcass ply has a modulus of elasticity of 9.8–24 $kN/mm^2$ and the organic fiber cord in the belt layer has a modulus of elasticity of 24–40 $kN/mm^2$.

In the tire according to the invention, at least one of the belt layers is constituted with the organic fiber cords, e.g. aramid fiber cords, so that the belt weight and hence tire weight can effectively be reduced as compared with the case that all of the belt layers are constructed with steel cords. In this case, it is obliged to lower the rigidity of the tread portion as mentioned in connection with the conventional technique. According to the invention, however, at least one of the carcass plies is constituted with the organic fiber cords having a modulus of elasticity higher than that of the conventional cord to increase the rigidity of the tire casing to thereby compensate for the lowering of the rigidity in the tread portion, whereby the degradation of the steering stability, wear resistance and the like due to the lowering of the rigidity in the tread portion can sufficiently be prevented. On the other hand, the decrease of the rubber gauge can be allowed without lowering the rigidity of the casing.

When the modulus of elasticity of the organic fiber cord as a carcass ply cord is less than 9.8 $kN/mm^2$, the rigidity of the tire casing can not be increased as is expected, while when it exceeds 24 $kN/mm^2$, the rigidity of the tire casing becomes too high and the ride comfort onto the vehicle is degraded, and further separation failure is apt to be caused at cord ends of the carcass ply turned around the bead core and hence there is a fear of degrading the durability of the tire.

On the other hand, when the modulus of elasticity of the organic fiber cord as a belt layer cord is less than 24 $kN/mm^2$, the rigidity of the tread portion is too low and hence such a rigidity lacking can not be compensated even by the increase of the rigidity of the casing as mentioned above, while when it exceeds 40 $kN/mm^2$, the peeling of the belt layer cord from coating rubber therefor and premature fatigue of the cord due to compression input are caused and hence there is feared the degradation of the durability due to cord breakage in the belt layer or the like.

In a preferable embodiment of the invention, the cords in the belt layer are obliquely extended at a cord angle of 20–50° with respect to an equatorial plane of the tire, whereby a large cornering power is developed and also an excellent wear resistance can be realized. Moreover, when the cord inclination angle exceeds 50°, there is a fear of degrading the durability in high-speed running.

In the tire according to the invention, it is favorable that at least one belt reinforcing layer containing cords such as nylon fiber cords, polyethylene naphthalate cords, aramid fiber cords and the like is arranged at an outer periphery side of the belt so as to extend subatantially in a circumferential direction of the tire.

In this case, the pushing-out deformation due to the action of centrifugal force or the like is effectively restrained under the function inherent to the belt reinforcing layer, while the belt reinforcing layer is contributed to increase the rigidity of the tread portion, whereby the steering stability, wear resistance and the like can be more advantageously improved in addition to the durability in high-speed running.

It is favorable that the modulus of elasticity of the cord in the belt reinforcing layer is made not less than 3.0 $kN/mm^2$ for more effectively developing the above effect. For example, therefore, when the belt is comprised of the single belt layer, steel cord having a higher modulus of elasticity can be selected in addition to the above various organic fiber cords as a cord of the belt reinforcing layer. Thus, the weight reduction of the tire is ensured as compared with the conventional technique, and all of the durability in high-speed running, steering stability, wear resistance and the like can be more improved.

When the modulus of elasticity of the cord in the belt reinforcing layer is less than 3.0 $kN/mm^2$, the belt reinforcing layer can not largely be contributed to the improvement of the durability in high-speed running and the increase of the rigidity of the tread portion.

BRIEF DESCRIPTION OF THE DRAWINGS

The invention will be described with reference to the accompanying drawings, wherein.

DESCRIPTION OF PREFERRED EMBODIMENTS

Figure 1:
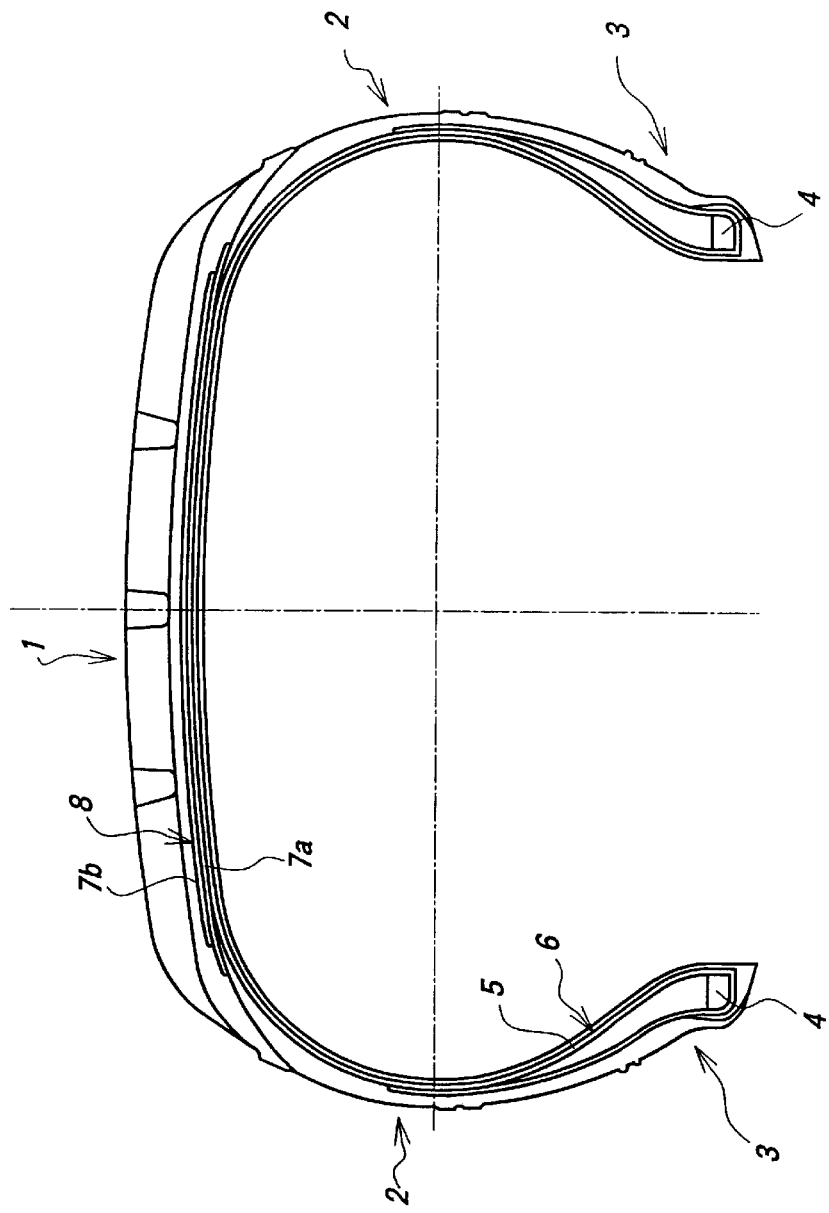
FIG. 1 is a diagrammatically radial section view of an embodiment of the pneumatic tire according to the invention.

In FIG. 1 is sectionally shown a first embodiment of the pneumatic tire according to the invention, wherein numeral 1 is a tread portion, numeral 2 a sidewall portion extending inward from each side end of the tread portion 1 in a radial direction of the tire, and numeral 3 a bead portion continuously extending from an inner end of the sidewall portion in the radial direction.

In such a tire, a radial carcass 6 forming a skeleton structure of the tire is comprised of, for example, one carcass ply 5 toroidally extending between a pair of bead cores 4 embedded in the respective bead portions 3, wherein both side portions of the radial carcass 6 are wound around the bead cores 4 from an inside of the tire toward an outside thereof in the radial direction. And also, the carcass ply 5 contains organic fiber cords extending at a cord angle of 90° or near to 90° with respect to an equatorial plane of the tire and having a modulus of elasticity of 9.8–24 kN/mm$^2$ such as polyethylene naphthalate fiber cord (hereafter abbreviated as PEN fiber cord), rayon fiber cord, polyester fiber cord of the like.

On an outer periphery side of a crown portion of the radial carcass 6 is disposed a belt 8 mainly contributing to the reinforcement of the tread portion 1 and comprised of, for example, two inner and outer belt layers 7a, 7b, wherein at least one of the belt layers 7a, 7b is constituted with organic fiber cords extending at a relatively small cord angle with respect to the equatorial plane of the tire, for example, at a cord angle of 20–50° and having a modulus of elasticity of 24–40 kN/mm$^2$ such as aramid fiber cord, polyester fiber cord or the like.

On an outer periphery side of the belt 8 may be further arranged at least one belt reinforcing layer comprised of organic fiber cord(s) extending substantially in the circumferential direction of the tire such as nylon fiber cord, PEN fiber cord, aramid fiber cord or the like so as to cover the belt 8 over a full width thereof or partly cover both side regions or a central region of the belt 8.

In such a pneumatic tire, at least one of belt layers conventionally constituted with steel cords is constituted with aramid fiber cords having a modulus of elasticity of 24–40 kN/mm$^2$, whereby the tire weight can effectively be reduced. On the other hand, the lowering of the rigidity of the tread portion due to the use of the aramid fiber cord as a cord of the belt layer is compensated by using the organic fiber cord having a modulus of elasticity of 9.8–24 kN/mm$^2$ higher than that of the conventionally used cord as a carcass ply cord to increase the rigidity of the tire casing, whereby the degradation of the steering stability, wear resistance, durability in high-speed running and the like can sufficiently be prevented.

Moreover, when the belt reinforcing layer is arranged on the outer periphery side of the belt 8, the rigidity of the tread portion is directly increased in addition to the improvement of the durability in high-speed running, whereby the fear of degrading the steering stability or the like can effectively be eliminated.

Figure 2:
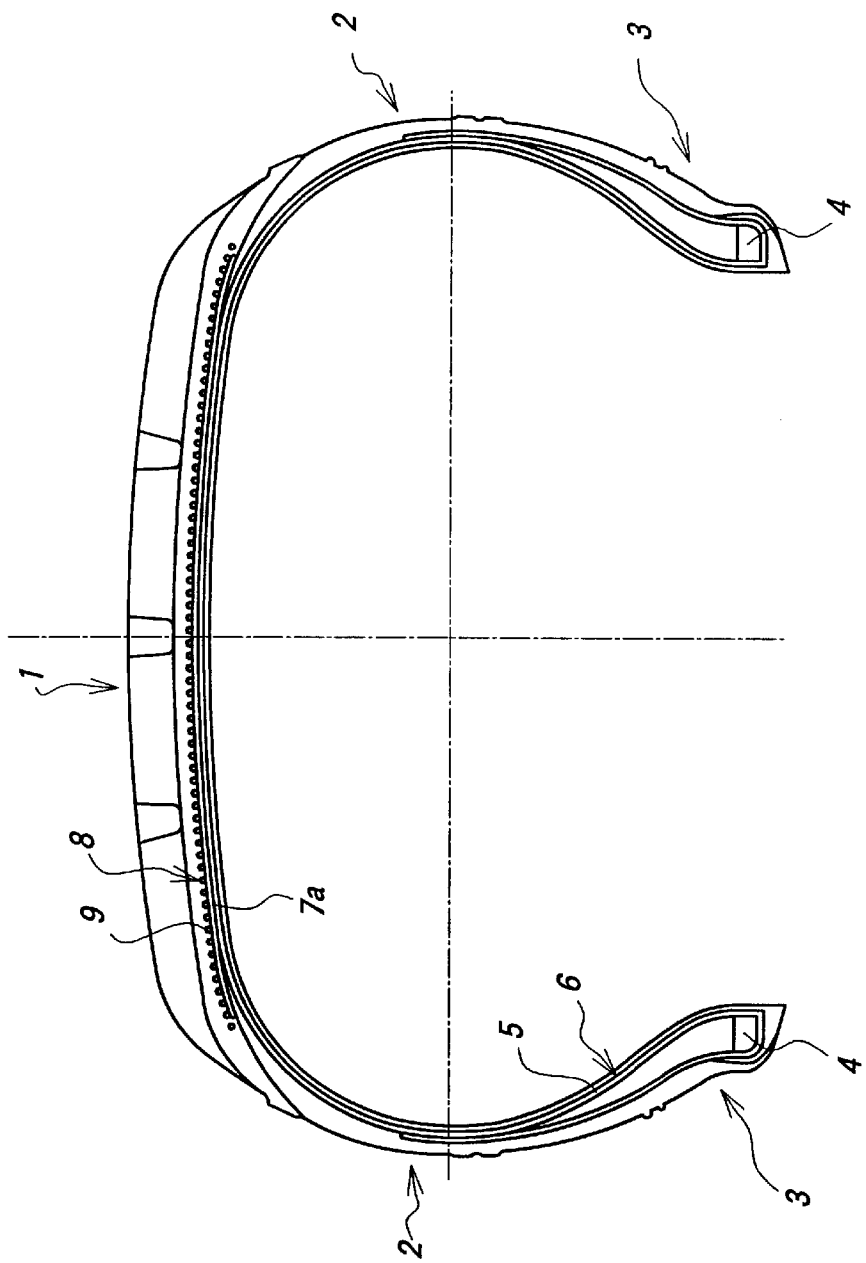
FIG. 2 is a diagrammatically radial section view of another embodiment of the pneumatic tire according to the invention.

In FIG. 2 is sectionally shown another embodiment of the pneumatic tire according to the invention.

In this case, the belt 8 is comprised of one belt layer 7a of the organic fiber cords, and one belt reinforcing layer 9 of the organic fiber cord extending substantially in the circumferential direction of the tire is disposed on the outer periphery side of the belt 8. Particularly, the cords in the belt layer have a modulus of elasticity of 24–40 kN/mm$^2$ and are extended at a cord angle of 20–50° with respect to the equatorial plane of the tire, and the cord of the belt reinforcing layer has a modulus of elasticity of not less than 3.0 kN/mm$^2$. Moreover, the carcass ply in the tire is comprised of organic fiber cords having a modulus of elasticity of 9.8–24 kN/mm$^2$.

Even in this tire, substantially the same effects as mentioned above can be obtained as regards the tire weight, steering stability, wear resistance, durability in high-speed running and the like.

The following examples are given in illustration of the invention and are not intended as limitations thereof.

There are prepared example tires having a tire size of 185/65R14 and constructions of carcass, belt and belt reinforcing layer as shown in Tables 1–4. The weight of each of these tires is measured, while such a tire is assembled onto a rim of 6J×14, inflated under an air pressure of 200 kPa and then the steering stability, wear resistance and durability in high-speed running are measured under a load of 350 kg by using a drum testing machine to obtain results as shown in Tables 1–4.

In Tables 1–4 are also shown the constructions of carcass, belt and belt reinforcing layer in conventional tires and comparative tires and measured results thereof.

The steering stability is evaluated by measuring a cornering power (CP)on the drum testing machine. The cornering power means a cornering force per 1 degree of slip angle. In this test, the steering stability is represented by an index on average of values measured up to slip angle of 7° on the basis that Conventional Example 1 is 100.

The wear resistance is evaluated by measuring a worn amount of a tread rubber after the tire is run on the drum testing machine provided with a false road surface at a speed of 50 km/h over a distance of 5000 km and represented by an index on the basis that Conventional Example 1 is 100.

The durability in high-speed running is evaluated by increasing the running speed on the drum testing machine every 10 km/h and measuring a speed at the occurrence of failure and represented by an index on the basis that Conventional Example 1 is 100.

In any case, the larger the index value, the better the property.

TABLE 1

|  |  | Conventional Example 1 | Conventional Example 2 | Comparative Example 1 | Example 1 | Example 2 | Example 3 | Comparative Example 2 | Comparative Example 3 |
|---|---|---|---|---|---|---|---|---|---|
| | | | | | | | Modulus of elasticity of carcass ply cord | | |
| Carcass | material | PET | PET | RAYON | RAYON | PEN | PEN | PEN | Aramid |
| | modulus of elasticity (kN/mm$^2$): 9.8–24 | 8.0 | 8.0 | 9.0 | 9.8 | 14.0 | 24.0 | 25.0 | 32.0 |
| | angle | 90 | 90 | 90 | 90 | 90 | 90 | 90 | 90 |
| | end count (cords/50 cm) | 52 | 52 | 52 | 52 | 52 | 52 | 52 | 52 |
| Inner belt layer | material | Aramid | STEEL | Aramid | Aramid | Aramid | Aramid | Aramid | Aramid |
| | modulus of elasticity (kN/mm$^2$): 24–40 | 32.0 | 200.0 | 32.0 | 32.0 | 32.0 | 32.0 | 32.0 | 32.0 |
| | angle | 34 | 34 | 34 | 34 | 34 | 34 | 34 | 34 |
| | end count (cords/50 cm) | 40 | 40 | 40 | 40 | 40 | 40 | 40 | 40 |
| Outer belt layer | material | Aramid | STEEL | Aramid | Aramid | Aramid | Aramid | Aramid | Aramid |
| | modulus of elasticity (kN/mm$^2$): 24–40 | 32.0 | 200.0 | 32.0 | 32.0 | 32.0 | 32.0 | 32.0 | 32.0 |
| | angle | 34 | 34 | 34 | 34 | 34 | 34 | 34 | 34 |
| | end count (cords/50 cm) | 40 | 40 | 40 | 40 | 40 | 40 | 40 | 40 |
| Belt reinforcing layer (spiral) | material | none | none | none | none | none | none | none | none |
| | modulus of elasticity (kN/mm$^2$): >30 | — | — | — | — | — | — | — | — |
| | angle | — | — | — | — | — | — | — | — |
| | end count (cords/50 cm) | — | — | — | — | — | — | — | — |
| Tire weight (N) | | 65.0 | 71.9 | 65.5 | 65.5 | 65.7 | 65.6 | 65.6 | 66.0 |
| Steering stability (CP: index) | | 100 | 105 | 108 | 106 | 111 | 110 | 110 | 114 |
| Wear resistance (index) | | 100 | 110 | 102 | 103 | 108 | 107 | 106 | 110 |
| Durability in high-speed running (index) | | 100 | 101 | 99 | 100 | 101 | 99 | 95 | 92 |

|  |  | Comparative Example 4 | Example 4 | Example 5 | Comparative Example 5 | Comparative Example 6 |
|---|---|---|---|---|---|---|
| | | Modulus of elasticity of belt layer cord | | | | |
| Carcass | material | PEN | PEN | PEN | PEN | PEN |
| | modulus of elasticity (kN/mm$^2$): 9.8–24 | 14.0 | 14.0 | 14.0 | 14.0 | 14.0 |
| | angle | 90 | 90 | 90 | 90 | 90 |
| | end count (cords/50 cm) | 52 | 52 | 52 | 52 | 52 |
| Inner belt layer | material | PET | PET | PET | PET | STEEL |
| | modulus of elasticity (kN/mm$^2$): 24–40 | 23.0 | 24.0 | 40.0 | 41.0 | 200.0 |
| | angle | 34 | 34 | 34 | 34 | 34 |
| | end count (cords/50 cm) | 40 | 40 | 40 | 40 | 40 |
| Outer belt layer | material | PET | PET | PET | PET | STEEL |
| | modulus of elasticity (kN/mm$^2$): 24–40 | 23.0 | 24.0 | 40.0 | 41.0 | 200.0 |
| | angle | 34 | 34 | 34 | 34 | 34 |
| | end count (cords/50 cm) | 40 | 40 | 40 | 40 | 40 |
| Belt reinforcing layer (spiral) | material | none | none | none | none | none |
| | modulus of elasticity (kN/mm$^2$): >30 | — | — | — | — | — |
| | angle | — | — | — | — | — |
| | end count (cords/50 cm) | — | — | — | — | — |

TABLE 1-continued

|  | Comparative Example 7 | Example 6 | Comparative Example 7 | Example 8 | Example 9 |
|---|---|---|---|---|---|
| Tire weight (N) | 64.8 | 64.8 | 65.9 | 65.9 | 71.2 |
| Steering stability (CP: index) | 94 | 97 | 113 | 113 | 116 |
| Wear resistance (index) | 95 | 98 | 110 | 109 | 118 |
| Durability in high-speed running (index) | 99 | 99 | 99 | 94 | 102 |

TABLE 2

|  |  | Cord angle of belt layer | | | | | Modulus of elasticity of belt layer cord | | | |
|---|---|---|---|---|---|---|---|---|---|---|
|  |  | Comparative Example 7 | Example 6 | Comparative Example 7 | Example 8 | Comparative Example 9 | Example 8 | Example 9 | Example 10 | Example 11 |
| Carcass | material | PEN | PEN | PEN | PEN | PEN | PEN | PEN | PEN | PEN |
|  | modulus of elasticity (kN/mm$^2$): 9.8–24 | 14.0 | 14.0 | 14.0 | 14.0 | 14.0 | 14.0 | 14.0 | 14.0 | 14.0 |
|  | angle | 90 | 90 | 90 | 90 | 90 | 90 | 90 | 90 | 90 |
|  | end count (cords/50 cm) | 52 | 52 | 52 | 52 | 52 | 52 | 52 | 52 | 52 |
| Inner belt layer | material | Aramid | Aramid | Aramid | Aramid | Aramid | Aramid | Aramid | Aramid | Aramid |
|  | modulus of elasticity (kN/mm$^2$): 24–40 | 32.0 | 32.0 | 32.0 | 32.0 | 32.0 | 32.0 | 32.0 | 32.0 | 32.0 |
|  | angle | 19 | 20 | 50 | 51 | 60 | 34 | 34 | 34 | 34 |
|  | end count (cords/50 cm) | 40 | 40 | 40 | 40 | 40 | 40 | 40 | 40 | 40 |
| Outer belt layer | material | Aramid | Aramid | Aramid | Aramid | Aramid | Aramid | Aramid | Aramid | Aramid |
|  | modulus of elasticity (kN/mm$^2$): 24–40 | 32.0 | 32.0 | 32.0 | 32.0 | 32.0 | 32.0 | 32.0 | 32.0 | 32.0 |
|  | angle | 19 | 20 | 50 | 51 | 60 | 34 | 34 | 34 | 34 |
|  | end count (cords/50 cm) | 40 | 40 | 40 | 40 | 40 | 40 | 40 | 40 | 40 |
| Belt reinforcing layer (spiral) | material | none | none | none | none | none | 6NYLON | 6NYLON | 66NYLON | 66NYLON |
|  | modulus of elasticity (kN/mm$^2$): >30 | — | — | — | — | — | 2.0 | 2.8 | 3.0 | 4.0 |
|  | angle | — | — | — | — | — | 0 | 0 | 0 | 0 |
|  | end count (cords/50 cm) | — | — | — | — | — | 50 | 50 | 50 | 50 |
| Tire weight (N) |  | 65.7 | 65.7 | 65.7 | 65.7 | 65.7 | 70.2 | 70.2 | 70.3 | 70.3 |
| Steering stability (CP: index) |  | 105 | 106 | 107 | 105 | 99 | 118 | 120 | 123 | 119 |
| Wear resistance (index) |  | 104 | 106 | 107 | 104 | 96 | 115 | 1108 | 119 | 120 |
| Durability in high-speed running (index) |  | 95 | 98 | 100 | 97 | 94 | 106 | 109 | 107 | 105 |

TABLE 3

|  |  | Cord in belt reinforcing layer | | | | | | | | |
|---|---|---|---|---|---|---|---|---|---|---|
|  |  | Comparative Example 10 | Example 12 | Example 13 | Example 14 | Example 15 | Example 16 | Example 17 | Example 18 | Example 19 |
| Carcass | material | PEN | PEN | PEN | PEN | PEN | PEN | PEN | PEN | PEN |
|  | modulus of elasticity (kN/mm$^2$): 9.8–24 | 14.0 | 14.0 | 14.0 | 14.0 | 14.0 | 14.0 | 14.0 | 14.0 | 14.0 |
|  | angle | 90 | 90 | 90 | 90 | 90 | 90 | 90 | 90 | 90 |
|  | end count (cords/50 cm) | 52 | 52 | 52 | 52 | 52 | 52 | 52 | 52 | 52 |
| Inner belt layer | material | Aramid | Aramid | Aramid | Aramid | Aramid | Aramid | Aramid | Aramid | Aramid |
|  | modulus of elasticity (kN/mm$^2$): 24–40 | 32.0 | 32.0 | 32.0 | 32.0 | 32.0 | 32.0 | 32.0 | 32.0 | 32.0 |
|  | angle | 34 | 34 | 34 | 34 | 34 | 34 | 34 | 34 | 34 |
|  | end count (cords/50 cm) | 40 | 40 | 40 | 40 | 40 | 40 | 40 | 40 | 40 |
| Outer belt layer | material | none | none | none | none | none | none | none | none | none |
|  | modulus of elasticity (kN/mm$^2$): 24–40 | — | — | — | — | — | — | — | — | — |
|  | angle | — | — | — | — | — | — | — | — | — |
|  | end count (cords/50 cm) | — | — | — | — | — | — | — | — | — |

TABLE 3-continued

| | | Cord in belt reinforcing layer | | | | | | | | |
|---|---|---|---|---|---|---|---|---|---|---|
| | | Comparative Example 10 | Example 12 | Example 13 | Example 14 | Example 15 | Example 16 | Example 17 | Example 18 | Example 19 |
| Belt reinforcing layer (spiral) | material | 6NYLON | 66NYLON | 66NYLON | PET | PET | PEN | Aramid | Aramid | Aramid |
| | modulus of elasticity (kN/mm$^2$): >30 | 2.8 | 3.0 | 4.0 | 23.0 | 24.0 | 25.0 | 32.0 | 40.0 | 41.0 |
| | angle | 0 | 0 | 0 | 0 | 0 | 0 | 0 | 0 | 0 |
| | end count (cords/50 cm) | 50 | 50 | 50 | 50 | 50 | 50 | 50 | 50 | 50 |
| Tire weight (N) | | 64.2 | 64.2 | 64.3 | 66.2 | 66.2 | 66.9 | 67.1 | 67.1 | 67.1 |
| Steering stability (CP: index) | | 88 | 92 | 92 | 93 | 95 | 98 | 100 | 102 | 113 |
| Wear resistance (index) | | 96 | 90 | 91 | 93 | 96 | 100 | 104 | 106 | 105 |
| Durability in high-speed running (index) | | 93 | 92 | 90 | 93 | 96 | 98 | 99 | (7 | 93 |

TABLE 4

| | | Cord angle of belt layer | | | | | |
|---|---|---|---|---|---|---|---|
| | | Comparative Example 11 | Example 20 | Example 21 | Example 22 | Comparative Example 12 | Comparative Example 13 |
| Carcass | material | PEN | PEN | PEN | PEN | PEN | PEN |
| | modulus of elasticity (kN/mm$^2$): 9.8–24 | 14.0 | 14.0 | 14.0 | 14.0 | 14.0 | 14.0 |
| | angle | 90 | 90 | 90 | 90 | 90 | 90 |
| | end count (cords/50 cm) | 52 | 52 | 52 | 52 | 52 | 52 |
| Inner belt layer | material | Aramid | Aramid | Aramid | Aramid | Aramid | Aramid |
| | modulus of elasticity (kN/mm$^2$): 24–40 | 32.0 | 32.0 | 32.0 | 32.0 | 32.0 | 32.0 |
| | angle | 19 | 20 | 34 | 50 | 51 | 60 |
| | end count (cords/50 cm) | 40 | 40 | 40 | 40 | 40 | 40 |
| Outer belt layer | material | none | none | none | none | none | none |
| | modulus of elasticity (kN/mm$^2$): 24–40 | — | — | — | — | — | — |
| | angle | — | — | — | — | — | — |
| | end count (cords/50 cm) | | | | | | |
| Belt reinforcing layer (spiral) | material | PET | PET | PET | PET | PET | PET |
| | modulus of elasticity (kN/mm$^2$): >30 | 23.0 | 23.0 | 23.0 | 23.0 | 23.0 | 23.0 |
| | angle | 0 | 0 | 0 | 0 | 0 | 0 |
| | end count (cords/50 cm) | 50 | 50 | 50 | 50 | 50 | 50 |
| Tire weight (N) | | 66.2 | 66.2 | 66.2 | 66.2 | 66.2 | 66.2 |
| Steering stability (CP: index) | | 85 | 90 | 95 | 92 | 89 | 86 |
| Wear resistance (index) | | 90 | 93 | 101 | 103 | 100 | 95 |
| Durability in high-speed running (index) | | 89 | 93 | 93 | 95 | 94 | 88 |

As seen from the results of Tables 1–4, the tire weight can effectively be reduced in all example tires as compared with Conventional Example 2 and Comparative Example 6 using steel cords in all of the belt layers, and also the deterioration of the steering stability, wear resistance and durability in high-speed running can effectively be controlled as compared with Conventional Example 1 using the aramid fiber cords in the two belt layers. On the other hand, in Examples 8–11 provided with the belt reinforcing layer, all of the above performances can largely be improved.

As mentioned above, according to the invention, the reduction of the tire weight can be realized without sacrificing substantially or completely the steering stability, wear resistance, durability in high-speed running and the like.

What is claimed is:
1. A pneumatic tire for a passenger car comprising:
a carcass comprised of one or more carcass plies and a belt disposed on an outer periphery side of a crown portion of the carcass and comprised of one or more belt layers, at least one carcass ply comprises polyethylene naphthalate fiber cords having a modulus of elasticity of 9.8–24 kN/mm$^2$ and at least one belt layer comprises aramid fiber cords having a modulus of elasticity of 24–40 kN/mm$^2$,
wherein at least one belt reinforcing layer containing cords is arranged at an outer periphery side of the belt so as to extend substantially in a circumferential direction of the tire, and
wherein the cord in the belt reinforcing layer has a modulus of elasticity of not less than 3.0 kN/mm$^2$.

* * * * *